Figure 1:
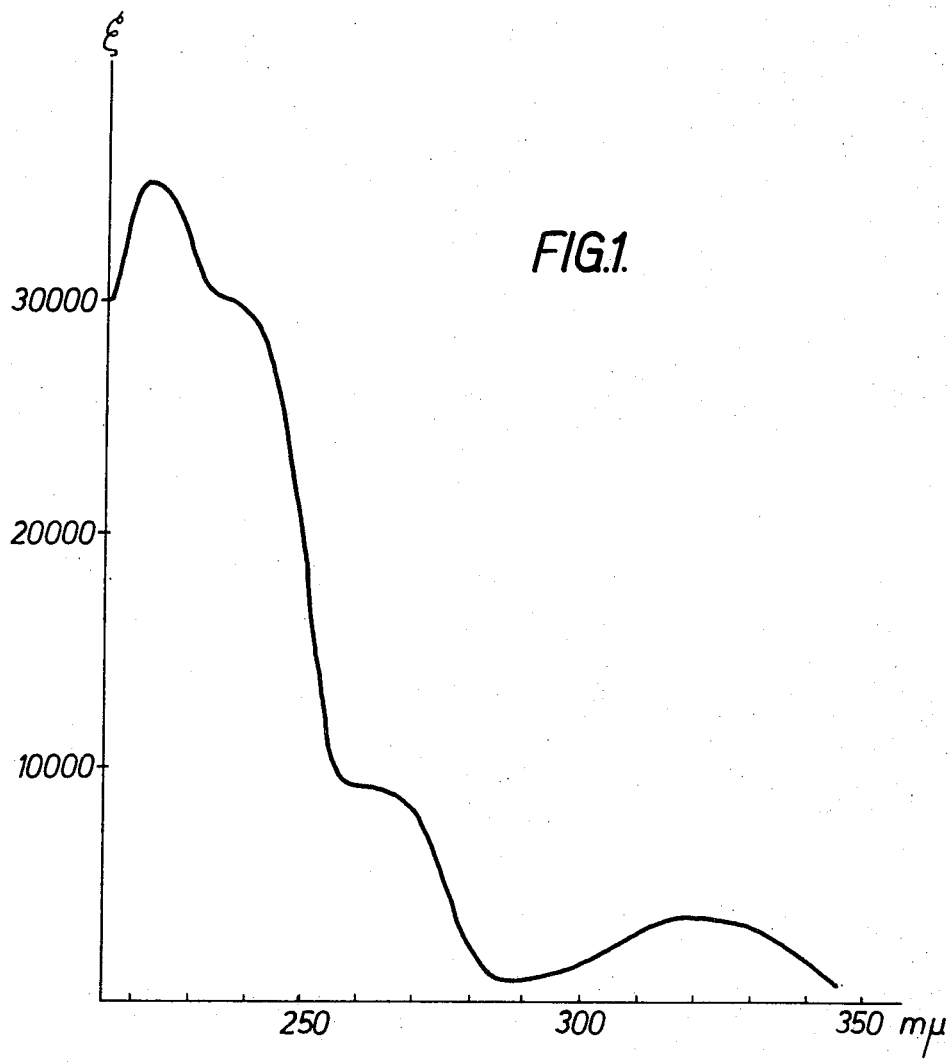

United States Patent
Arima et al.

[15] 3,692,777
[45] Sept. 19, 1972

[54] 5H-PYRROLO [2,1-C][1,4] BENZODIAZEPIN-5-ONES

[72] Inventors: Kei Arima; Gakuzo Tamura, both of Tokyo; Heiichi Sakai; Masanobu Kohsaka, both of Osaka, all of Japan

[73] Assignee: Fujisawa Pharmaceutical Co., Ltd., Osaka, Japan

[22] Filed: Dec. 29, 1969

[21] Appl. No.: 888,991

[30] Foreign Application Priority Data

Dec. 30, 1968   Japan ............................44/83

[52] U.S. Cl. ..............................260/239.3 T, 195/80
[51] Int. Cl. ................................................C07d 53/06
[58] Field of Search ................................260/239.3 T

[56] References Cited

UNITED STATES PATENTS 3,524,849   8/1970   Batcho et al. ........260/239.3 T

Primary Examiner—Henry R. Jiles
Assistant Examiner—Robert T. Bond
Attorney—Harry C. Bierman, Jordan B. Bierman and Bierman & Bierman

[57] ABSTRACT

This invention contains a novel antibiotic produced by a culture of *Streptomyces achromogenes* var. *tomaymyceticus* in a nutrient medium and derivatives thereof which are active against a number of microorganisms, phages and viruses, and effective in the treatment of tumors.

9 Claims, 4 Drawing Figures

5H-PYRROLO [2,1-C][1,4] BENZODIAZEPIN-5-ONES

This invention relates to a new and useful antibiotic, derivatives thereof, and to methods for production thereof. More particularly, it relates to a new antibiotic in various forms, and to processes producing it by fermentation, as well as concentrating, recovering, purifying and isolating it, and producing its derivatives.

The invention includes within its scope an antibiotic substances in dilute forms, as crude concentrates, and in pure crystalline forms. The desired antibiotic and its derivatives exhibit high activity against a variety of microorganism including gram-posive and gram-negative bacteria, fungi and bacteriophage. The strong virucidal action on some viruses in vitro was observed. A further important antibiotic property observed in some of the compounds is their ability to inhibit the growth and development of certain of transplantable and induced tumors. The antibiotic properties of the compounds make the compounds of great utility as therapeutic agents in the treatment of many diseases. The antibiotic of this invention is produced in a fermentation process under controlled conditions in which a hitherto undiscovered species of Streptomyces is used.

THE MICROORGANISM

The microorganism useful for the production of this antibiotic is a newly discovered species of Streptomyces isolated from a soil sample collected at Musashi-Koganei in Japan. A culture of the living organism has been deposited with, and added to a permanent stock collection of, the American Type Culture Collection, Rockville, Md., in U.S.A. It has now been assigned the number ATCC 21353 and is hereinafter designated as *Streptomyces achromogenes* var. *tomaymyceticus*.

It is to be understood that for the production of the new antibiotic this invention is not limited to the use of the described particular organism or of organisms fully answering the growth and microscopic characteristics described herein which are given for illustrative purposes. It is essentially desired and intended to include the use of mutants produced from the desired organism by various means, such as X-rays, ultraviolet radiation, nitrogen mustards and phage exposure.

It is also desired and intended to include any organism regardless of its appearance or physiological behavior, that may be developed by means of transformation, transduction, genetic recombination or some other genetic procedures using a nucleic acid form the described species, whereby it has acquired the ability to produce the elaborating product herein described or to carry on the biological change herein described.

For isolating and characterizing the microorganism, a portion of the soil sample is shaken in sterile distilled water and plated on Krainsky agar medium. After it is incubated at 30° C. for 7 days, colonies of *Streptomyces achromogenes* var. *tomaymyceticus* ATCC 21353 are isolated from the medium and then grown on Bennett's agar medium.

MICROSCOPIC MORPHOLOGY

The morphology of *Streptomyces achromogenes* var. *tomaymyceticus* ATCC 21353, when grown on Czapek's agar at 30° C. for 10 to 14 days, is given below. The conidium is spherical to oval with a smooth surface. There is a branching and straight or slightly curved long aerial mycelium with thin growth.

CULTURAL AND PHYSIOLOGICAL CHARACTERISTICS

The cultural and physiological characteristics of new strain S. achrom. var. tomaymyceticus ATCC 21353 in a number of media are listed below. The observation was made after 10 to 14 days' incubation at 30° C. The incubation period and temperature are the same as those described herein unless otherwise indicated.

Czapek's agar — White to pale yellowish colony-like growth; thin growth of powdery white aerial mycelium; no soluble pigment.

Starch-ammonium agar — Faint grayish growth with powdery, dark gray aerial mycelium; no soluble pigment. There is a weak diastatic action. Glucose-asparagine agar — White to light ivory colony-like growth; no growth or thin growth of powdery white aerial mycelium, no soluble pigment.

Calcium malate agar — Creamy growth with powdery, white to dark gray aerial mycelium; no soluble pigment. Calcium malate is solubilized. Tyrosine agar — Thin colorless or light brownish vegetative growth with no aerial mycelium and no soluble pigment.

Bouillon agar — Creamy colony-like growth with no aerial mycelium; borwnish soluble pigment produced. Hydrogen sulfide not produced after 7 days' incubation.

Bennett's agar — Light creamy colony-like growth; no aerial mycelium and no soluble pigment. After incubation at 37° C., it produced a brownish colony-like growth with a powdery, dark grayish aerial mycelium and a production of a brown soluble pigment.

Glucose-bouillon — Creamy, colony-like growth with a brown soluble pigment; no growth of aerial mycelium.

Glucose-Czapek—s solution — Surface growth poor, colorless, colony-like, with thin growth of powdery white aerial mycelium and no soluble pigment. Nitrate is none or weakly reduced to nitrite.

Gelatin stab — Creamy growth with no aerial mycelium an no soluble pigment after incubation for 21 days at 15° to 20° C. There is a weak liquefaction of gelatin.

Litmus milk — The culture grows as a creamy ring at the surface. Faint grayish brown soluble pigment is produced.

There is a slight peptonization, but no coagulation.

Potato plug — Grayish creamy vegetative growth with wrikled surface; thin growth of powdery white aerial mycelium; dark brown soluble pigment produced.

Cellulose agar — There is no growth with ammonium or nitrate ions as nitrogen sources.

UTILIZATION OF CARBON SOURCES

The utilization of carbon sources was carried out by the Pridham and Gottlieb method after 7 days' incubation at 30° C.

a. Substarates well utilized include: Glucose, xylose, mannose, fructose, and mannitol.

b. Substrates moderately utilized include: Arabinose, rhamnose, sucrose, lactose, trehalose, raffinose, and inositol.

c. Substrate poorly utilized includes: Salicin.

THE ANTIBIOTIC

The new antibiotic of the invention is produced when *Streptomyces achromogenes* var. *tomaymyceticus* is grown in a nutrient medium under controlled submerged aerobic conditions. A wide variety of nutrient media may be used in the growing stage of the process. It has now been found that the best results are obtained when an aqueous medium containing an assimilable carbon source and an assimilable nitrogen source or a proteinaceous material is employed. Assimilable carbon sources are here understood to include polyhydric alcohols and mono-, di-, and poly-saccharides such as glucose, fructose, sucrose, sugar, brown sugar, starch, corn starch, gelactose, dextrin, glycerol, molasses and the like. Proteinaceous materials include unmodified protein and protein degradation products, particularly such products as arise from the hydrolysis of proteins. Assimilable nitrogen compounds and proteinaceous materials may include corn steep liquor, yeast, autolyzed brewer's yeast with milk solids, soybean meal, peanut meal, cottonseed meal, corn meal, milk solids, pancreatic digest of casein, distillers' solubles, animal peptone liquors, meal extract, peptone, fish meal, yeast extract, and meal and bone scraps, and inorganic materials such as nitrates and ammonium salts. These carbon sources and nitrogen sources, though advantageously employed in combination, need not be used in pure form as the less pure materials which contain traces of growth factors and considerable quantities of mineral nutrients are suitable for use. When desired, there may be supplied with mineral salts such as sodium chloride and potassium chloride, and buffering agents such as calcium carbonate and calcium phosphate. If necessary, a defoaming agent such as liquid paraffin, fatty oils or silicone may be added to the fermentating medium.

For maxima growth and development of *Streptomyces achromogenes* var. *tomaymyceticus*, the culture medium prior to inoculation with the organism should be adjusted to between about pH 5.5 and pH 8.0, preferably between about pH 6.0 and pH 7.0. It has been observed that during the growth period of the organism and the production of the antibiotic, the medium may be continued to keep the pH between about 6.0 to 6.5 Optical and maxima antibiotic production appears to occur with the culture medium maintained at about 25° to 37° C., and within about 40 to 80 hours. At the end of this period of time, a substantial amount of the antibiotic has been formed.

As is preferred for the production of other antibiotics in massive amounts, submerged aerobic cultural conditions are the conditions depending upon choice for the production of large amounts of the antibiotic. For the production of smaller quantities of the antibiotic, the submerged culture method may be carried out in small flasks or bottles which are either shaken or stirred by suitable mechanical means. However, when large volumes of the inoculated nutrient medium can be cultivated in large tanks or vats customarily employed in the fermentation industry. For the production of large amounts, it is preferable to use the vegetative form of the organism for innoculation of the production tanks or vats to avoid a growth lag in the production of the antibiotic. Accordingly, it is desirable first to produce a vegetative inoculum of the organism by inoculating a relatively small quantity of culture medium with the spore form of the organism, and then to transfer the vegetative inoculum aseptically to the large tanks or vats. The medium in which the vegetative inoculum is produced can be the same or different medium as that utilized for the production of the antibiotic.

Agitation and aeration of the culture mixture may be accomplished in a variety of ways. Agitation may be provided by a propeller, or similar mechanical agitation devices, by revolving or shaking the fermenter, by various pumping devices, or by the passage of sterile air through the medium. Aeration may be effected by injecting sterile air into the fermentation mixture, or it may be provided by spraying, splashing or spilling the mash into or through an atmosphere.

After the antibiotic of this invention is separated from the whole broth by filtration or centrifugation, it can be recovered from the culture medium by extractive or adsorptive techniques which are commonly used in connection with the recovery of other antibiotics. The extraction may be accomplished by use of solvents, preferably polar organic solvents, including alcohols such as methanol, ethanol, propanol, isopropanol and butanol; alkyl esters of fatty acids such as ethyl acetate; ketones such as acetone; chlorinated hydrocarbons such as chloroform; and pyridine. Other solvents of similar character can also be used. Combination of these solvents is advantageously employed. Alternatively, the antibiotic can be recovered from the culture broth with an adsorbing agent such as diatomaceous earth, activated alumina, silica gel, activated carbon, and silicic acid. The antibiotic is readily eluted from the adsorbent by employing a polar organic solvent where it has solubility. A suitable method of recovering the antibiotic from the extract or the eluate comprises the evaporation of the solvent to a relatively small volume, and the precipitation of the antibiotic by the addition of a miscible solvent where the antibiotic is insoluble. The antibiotic is then purified by recrystallization or chromatography. Suitable solvents for recrystallization are aqueous acetone, aqueous methanol, and any other solvents in that the antibiotic has some solubility. Adsorbing agents useful for recovering the antibiotic can also be employed effectively for purification by chromatography. Eluents useful in connection with the recovery of the antibiotic can also be employed.

The antibiotic which is isolated by the substantially same procedures as mentioned above is in a form of powders.

THE DERIVATIVES

The derivatives of the antibiotic may be prepared by treating the antibiotic, isolated from the extract or eluate or not isolated, with alcohols, thio-alcohols or dialkylamine.

The derivatives of this invention are represented as follows:

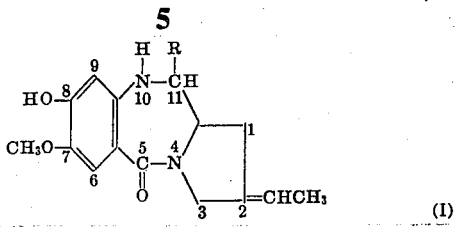

in which R is lower alkyl oxy or aryl lower alkyl oxy.

This reaction may be carried out by processes comprising merely dissolving the power form of the antibiotic in alcohols of the formula: RH in which R is lower alkyl oxy or aryl lower alkyl oxy, and cooling the solution to form crystalline materials. Examples of alcohols are lower aliphatic alcohols containing therein one to six carbon atoms and aromatic alcohols containing therein seven to eight carbon atoms. As lower aliphatic alcohols are advantageously used methanol, ethanol, propanol and isopropanol; as aromatic alcohols, benzylalcohol is used. For maxima and optical preparation of the derivatives the reaction may be advantageously accomplished in a solvent inert in the reaction per se. Examples of solvents are methane dichloride, chloroform, carbon tetrachloride and ethyl acetate. The reaction temperature is not limited, but preferably the reaction is generally carried out at room temperature, although temperatures below or above room temperature can also be used.

It is to be understood that addition of alcohols of formula RH provides the introduction of the residue of the group R of said compounds in the 11th position of the ring structure.

The compound of formula (I) may be readily converted to a compound of formula as follows:

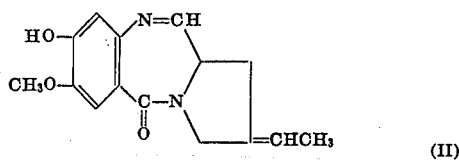

The elimination of a substituent on the 11th position of the ring may be effected by processes comprising dissolving the compound of Formula (I) in a solvent such as n-hexane, acetonitrile, acetone, chloroform or ethyl acetate. The excess amount of said solvents may be effectively used. This elimination reaction is preferably performed at room temperature, but the application of elevated temperature may also be useful in promoting the reaction and lowering the reaction period. The preparation formed in the solution may be collected by conventional techniques such as filtration or decantation or centrifugation.

The compounds of Formulas (I) and (II) can be converted by acylation to a compound of formula as follows:

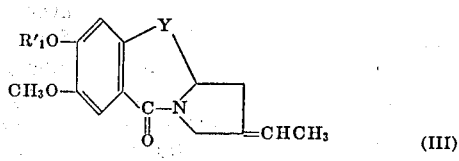

in which $R'_1$ is lower alkyl carbonyl, aryl lower alkyl carbonyl or aryl carbonyl and Y is —NH—CHR— or —N=CH— wherein R is as above.

Acylation reaction may be conducted by mixing the compound with an acylating agent in a solvent such as pyridine. Any acylating agent which is capable of providing an acyl radical that reacts with a hydroxyl group on the 8th position can be used. Among these acids, acid halides, acid anhydrides, and acid esters. Examples of the acylating agents are acetic acid, propionic acid, benzoic acid, P-bromobenzoic acid, chlorides and bromides thereof, anhydrides thereof, and methyl and ethyl esters thereof. Addition of such acylating agents may be preferably made at room temperature or while cooling the solution. Processes comprising placing the reaction mixture and cooling or pouring an acylating agent onto an ice-water mixture result in preparation of the acylated compounds. This acylated compounds may be crystallized by dissolving a precipitated material in a solvent such as acetonitrile or methanol which is obtained by filtration of a preparation to be followed by a silica gel chromatography of the filtrate, or by washing the filtrate with water. The crystallized compounds may be isolated form a solution by conventional techniques such as filtration.

The compounds of Formulas (I) and (II) can further be converted by alkylation to a compound of formula as follows:

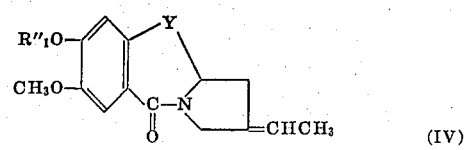

in which $R''_1$ is lower alkyl and Y is as above. Alkylation reaction may be carried out by mixing the compound with an alkylating agent in a solvent such as methanol. Any alkylating agent which is capable of providing an alkyl radical that reacts with a hydroxyl group on the 8th position of the compound can be used. Among these are diazoalkanes and dialkyl sulfates. Examples of the alkylating agents are diazomethane, diazoethane and dimethyl sulfate. This alkylation reaction may be effectively conducted while cooling the reaction mixture. A presently preferred procedures for preparing the alkylated compound comprise placing the solution in a refrigerator, concentrating to dryness, dissolving in methanol and adding ether to a methanol solution and cooling the ethereal solution at 0°C. The preparation of the alkylated compounds may be isolated by conventional techniques such as filtration.

The compounds of Formulas (III) and (IV) wherein Y is —N=CH— may be readily converted to a compound wherein Y is —NH—CHR— where R is as above. The reaction used for the conversion of the compound of Formula (II) to the compound of Formula (I) may be also used.

For convenience and the clear embodiment of the compounds of this invention all the formulas described above are represented by a formula as follows:

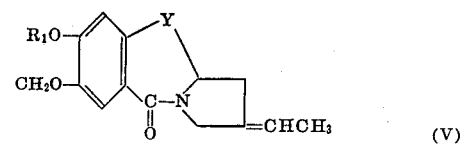

in which $R_1$ is hydrogen, lower alkyl, lower alkyl carbonyl, aryl lower alkyl carbonyl or aryl carbonyl and Y is as above, wherein the lower alkyl group having one to six carbon atoms, and aryl lower alkyl group having seven to eight carbon atoms.

The antibiotic and derivatives thereof produced by the above mentioned procedures exhibit high activity against a number of microorganisms. The following is a description of antimicrobial utility of the 11-methoxy compound of Formula (I). The activity of the compound is expressed as its minimum inhibitory concentration (MIC) which is determined by the usual serial agar dilution method. The tests were performed for bacteria by the use of a glucose-bouillon medium and for fungi and yeast by the use of a Sabouraud medium. The test medium was incubated for 24 – 72 hours at 30° C., and the MIC's are expressed by the concentration of the compound in mcg./ml. which inhibited growth of the organism.

The tests were made with the 11-methoxy compound of Formula (I) and the following is the test results.

| Test Organisms | MIC |
|---|---|
| Staphylococcus aureus 209-P | 6.2 |
| Bacillus substilis ATCC 6633 | 12.5 |
| Corynebacterium xerosis | 25.0 |
| Sarcina lutea | 25.0 |
| Escherichia coli | 100.0 |
| Pseudomonas aeruginosa | 100.0 |
| Proteus vulgaris | 100.0 |
| Aspergillus niger | 50.0 |
| Penicillium chrysogenum Q-176 | 25.0 |
| Saccharomyces cerevisiae | 50.0 |
| Torula utilis | 50.0 |
| Candida albicans | 50.0 |

Results of in vitro tests with the 11-methoxy compound against bacteriophages are mentioned below. The tests were performed by adding 1 ml. of a suspension containing $2 \times 10^4$ particles of the test phage per ml. in 0.01M—Tris—HCl buffer (pH 7.2) to each dilution (1 ml.) of samples of the compound to be tested in the above buffer. The mixture (0.1 ml.) incubated for one hour at 37° C. was poured into a Petri dish with 1.5 percent nutrient agar. Phage-count was made by the drop-method with the respective host strain in that the amount inactivating just 50 percent of the phages is expressed in mcg./ml.

| Test Phages | Concentration inactivating 50% phage activity |
|---|---|
| Escherichia coli $T_1$ phage | 0.1 |
| Escherichia coli $T_2$ phage | 3.2 |
| Escherichia coli $T_3$ phage | 0.2 |
| Escherichia coli $T_4$ phage | 3.2 |
| Escherichia coli λ phage | 1.0 |
| Escherichia coli β phage | 12.5 |
| Escherichia coli MS-2 phage | 12.5 |
| Bacillus subtilis M-2 phage | 0.2 |
| Bacillus subtilis SP-10 phage | 0.2 |
| Lactobacillus acidophilus $J_1$ phage | 50.0 |
| Pseudomonas aeruginosa $P_1$ phage | 12.5 |

Some of the compounds have been found to also exhibit antiviral and antitumor activity. Agast the DNA virus Herpes Simplex hominis the 11-methoxy compound of Formula (I) was active in vitro. In these experiments doses of 0.1 and 0.05 mg./ml. in a solution of distilled water with 10 percent dimethylsulfoxide were mixed in tubes with equal parts of virus suspension in Hanks solution in the dilution 10 to the minus 3.5. After different times of contact at 22° C. the dose of 0.2 ml., which was titered before in Hanks solution as $LD_{95}$, was injected intraperitoneally into randomized groups of 10 male mice of the strain NMRJ, of 15 to 19 g. of weight. As control, 10 mice were injected with 0.2 ml. of the mixture virus suspension plus a solution of distilled water with 10 percent DMSO as above without the 11-methoxy compound.

As result, the 100 percent mortality of the control was reduced to 20 percent after 1 hour and 4 hours and to zero after 6 hours contact. This means that the virulence of this DNA virus is partly or completely destroyed by action of the 11-methoxy compound. The 11-methoxy compound further shows complete inhibition of various transplantable ascites tumors, such as Ehrlich Carcinoma and Cr. Sarcoma 180 in mice, strain NMRJ, and of the Yoshida Sarcoma strains AH 66 R and AH 130 in Wistar rats. Against the solid Walker Carcino Sarcoma it is also affective in intratumoral administration. The leukemia strains L1210–S and L1210–r (6-mercaptopurine-resistant) are partially inhibited: 26–50 percent (L1210–S) and 51–75 percent (L1210–r) prolongation of survival time with the well tolerated dose of 0.125 mg./kg. I.P., 4 applications on 4 consecutive days. In all these tests with transplantable ascites tumor strains the mice or rats were transplanted with a distinct amount of cells or cell material in Hanks solution, the dose of which causing 100 percent takes. Randomized groups of 8 animals per dose in rats or 10 animals per dose in mice were treated for the first time 4 hours after transplantation with the dose of the 11-methoxy compound, followed by daily application of the same dose on the 3 following days. Solutions were prepared in triethyleneglycol with 90 percent distilled water. A single dose was given in 0.5 ml. per 20 g. mouse and 1 ml. per 100 g. rat and finally calculated per kg.

The activity of the 11-methoxy compound was dose dependent, but a 99 percent inhibition was still seen with 0.0625 mg./kg. I.P. in the ascites tumors Ehrlich Carcinoma and Cr. Sarcoma 180 (mouse) and with 0.1 mg./kg. I.P. and 0.05 mg./kg. I.P. in Yoshida Sarcoma AH 66R and Yoshida Sarcoma AH 130 (rat).

All the mentioned doses applied in the chemotherapeutic experiments were well tolerated by the test animals.

The desired compounds of this invention may be used as medicaments in the form of pharmaceutical preparations, which contain the antibiotic or its derivatives in admixture with a pharmaceutically acceptable organic or inorganic, solid or liquid carrier suitable for oral or parenteral administration. The pharmaceutical preparations may be in solid form such as capsules, tablets or dragees, or in liquid form such as solutions, suspensions or emulsions. If desired, there can be included in the above preparations auxilliary substances, for examples, as preserving agents, stabilizing agents, wetting or emulsifying agents, salts for varying the osmotic pressures and buffers. While the dosage of the compounds will vary from the compound to the compound, and also depend upon the age and condition of each individual patient being treated, a daily dose of about 20 mg./kg. of the compound generally is given for treating diseases against which the antibiotic or its derivatives are useful.

The following examples are intended to illustrate the process of the invention, but are not to be construed as limiting the scope thereof.

EXAMPLE 1

The vegetative growth and spores of Streptomyces achromogenes var. tomaymyceticus ATCC 21353, grown on agar slants, was transferred to a 500 ml. flask containing 100 ml. of the following medium.

| Ingredients | Percent by weight |
|---|---|
| Lactose | 3 |
| Meat extract | 1 |
| Yeast extract | 1 |
| Polypeptone | 1 |
| Sodium chloride | 0.25 |

This medium was sterilized and inoculated from agar slants. It was shaken for 3 days at 30°C.

In a 2-ton stainless tank was placed 1,000 liters of a fermentation broth having the following composition.

| Ingredients | Percent by weight |
|---|---|
| Lactose | 3 |
| Meat extract | 1 |
| Yeast extract | 1 |
| Polypeptone | 1 |
| Sodium chloride | 0.25 |
| Potassium dihydrogen phosphate | 1.5 |
| Sodium hydrogen phosphate 12H$_2$O) | 0.43 |

The pH of the medium was adjusted to 6.1. The culture broth was sterilized by heating it under pressure at about 120° C. for about 30 minutes. The broth was cooled and about 1 ml. of the above inoculant culture was added aseptically. The organism was grown in the broth for 50 to 60 hours at a temperature of 30° C. During the growth period the broth was stirred and sterile air was blown through the broth at a rate of about 1,000 liters of sterile air per minute on a propeller shaker operating at 350 r.p.m.

After the fermentation was completed, the mycelium was removed by centrifugation. The supernatant was treated by adsorbing an active ingredient on about 5 kg. of activated carbon by stirring it for 30 minutes. After the mixture was filtered, the activated carbon was extracted with 100 liters of a mixture of pyridine, ammonia, ethanol and water in a ratio of 10 : 3 : 80 : 10 by warming it at 45° C. for 30 minutes to be followed by the reextraction of the activated carbon. The extract was concentrated under reduced pressure at 50° C. and freeze-dried to yield 1.6 kg. of powders. The powders were washed with about 10 liters of n-hexane, dissolved in water and the solution was adjusted to pH 2 to 3. The acidified solution was extracted with four 5-liter portions of chloroform. The chloroform extract was washed with 5 percent sodium bicarbonate aqueous solution, dried over sodium sulfate and concentrated under reduced pressure at 50° C. to an oily residue which was treated with petroleum ether. The filtration of the petroleum ether solution provided about 20 g. of powders which was dissolved in 100 ml. of ethyl acetate and adsorbed on silicic acid in a column and eluted with about 8 liters of ethyl acetate. The eluate was concentrated to almost dryness to be followed by the addition of about 30 ml. of methanol. The precipitate was formed in the methanol solution by placing it at -20°C. for 2 days and filtered to yield about 1.8 g. of crude crystalline material which was then dissolved in about 30 ml. of warm methanol. The methanolic solution was allowed to stand for 2 days at -20°C. to produce 1.2 g. of pure crystalline 1,2,3,10,11,11a-hexahydro-2-ethylidene-7,11-dimethoxy-5H-8-hydroxy-5H-pyrrolo[2,1-c][1,4]benzodiazepin-5-one melting at 145- 146.5°C. (decomposed).

Analysis calculated for $C_{18}H_{20}N_2O_4$:

|  | C | H | O | N |
|---|---|---|---|---|
|  | 63.16 | 6.58 | 21.05 | 9.21 |
| Found: | 62.95 | 6.66 | 21.25 | 9.05 |

The ultraviolet absorption spectrum of this compound in methanol shows maximum peaks at 224 m$\mu$($\epsilon$=36,000) and 320 m$\mu$($\epsilon$=3,600), and shoulders at 237 m$\mu$ ($\epsilon$=30,000) and 260 m$\mu$($\epsilon$=9,000), as shown in FIG. 1.

Figure 2:
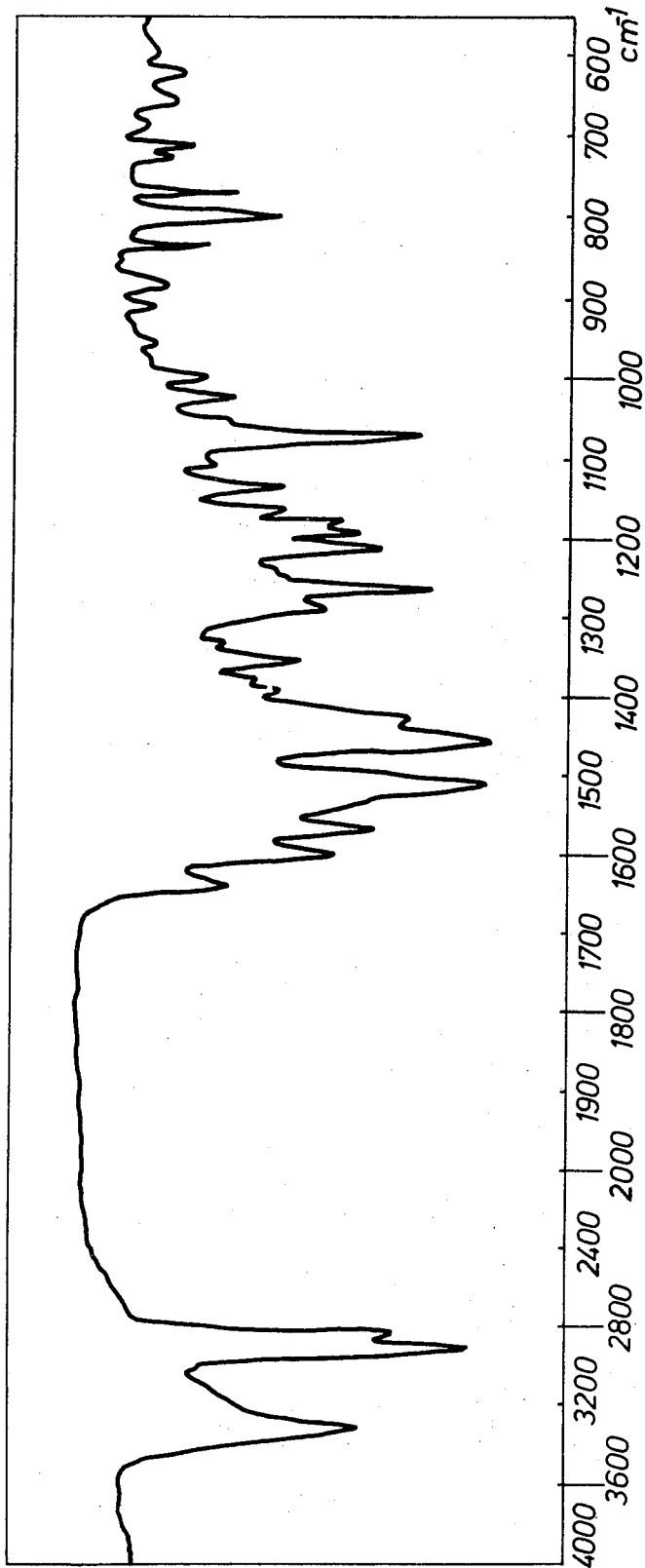

The infrared absorption spectrum in Nujol mull shows bands at 3,340, 1,640, 1,570, 1,510, 1,425, 1,290, 1,265, 1,210, 1,190, 1,180, 1,070, 830, 800, and 765 in reciprocal centimeters as in FIG. 2.

Alternatively, 100 liters of the fermentation broth produced in Example 1 as above which was adjusted with hydrochloric acid to pH 2 was extracted with three 30-liter portions of chloroform. The chloroform layers were combined and concentrated to about 10 liters to be followed by the addition of 10 liters of methanol. The solution was further concentrated to about 300 ml. by the slow addition of methanol. The methanolic solution was placed in a cold refrigerator to form a precipitate which was filtered and washed with ethyl acetate. The resultant powders were dissolved in warm methanol and allowed to stand in a cold place to precipitate a crystalline material which was recrystallized from methanol to obtain about 2 g. of 1,2,3,10,11,11a-hexahydro-2-ethylidene-7, 11-dimethoxy-8-hydroxy-5H-pyrrolo[2,1-c][1,4]benzodiazepin-5-one.

EXAMPLE 2

100 Liters of the fermentation broth produced in Example 1 which was adjusted with hydrochloric acid to pH 2 was extracted with three 30-liter portions of ethyl acetate. The extract was concentrated to dryness which was dissolved in small amount of chloroform. The solution was passed through a column packed with silica gel. The silica gel column was eluted with a mixed solvent of ethyl acetate and chloroform in a ratio of 3 : 1. The eluate was concentrated to dryness which was dissolved in n-hexane to form a precipitate. The precipitate was filtered, dissolved in chloroform and chromatographed as disclosed above to yield powders.

The powders were dissolved in ethanol and kept in a cold place to form a crystalline material which was recrystallized from ethanol to obtain a faint yellow needle of 1,2,3,10,11,11a-hexahydro-2-ethylidene-7-methoxy-8-hydroxy-11-ethoxy-5H-pyrrolo[2,1-c][1,4]benzodiazepin-5-one melting at 134°–136° C. (decomposed).

Analysis Calculated for $C_{17}H_{22}N_2O_4$:

|  | C | H | O | N |
|---|---|---|---|---|
|  | 64.13 | 6.97 | 20.10 | 8.80 |
| Found: | 63.85 | 7.02 | 20.77 | 8.44 |

Figure 3:
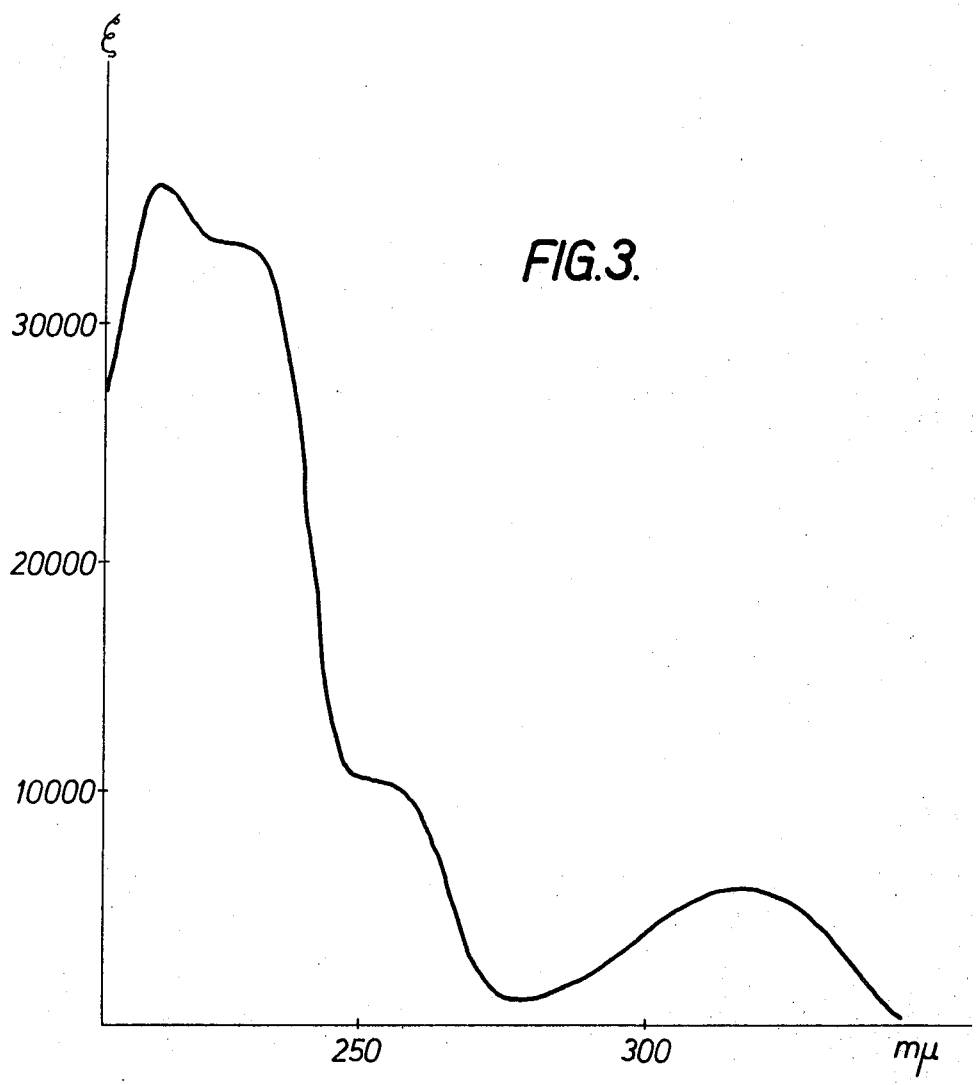

It displays ultraviolet absorption peaks, in ethanol, at 225 m$\mu$($\epsilon$=38,000) and 325 m$\mu$($\epsilon$=6,700), and shoulders at 235 m$\mu$($\epsilon$=35,000) and 262 m$\mu$($\epsilon$=11,000), as shown in FIG. 3.

Figure 4:
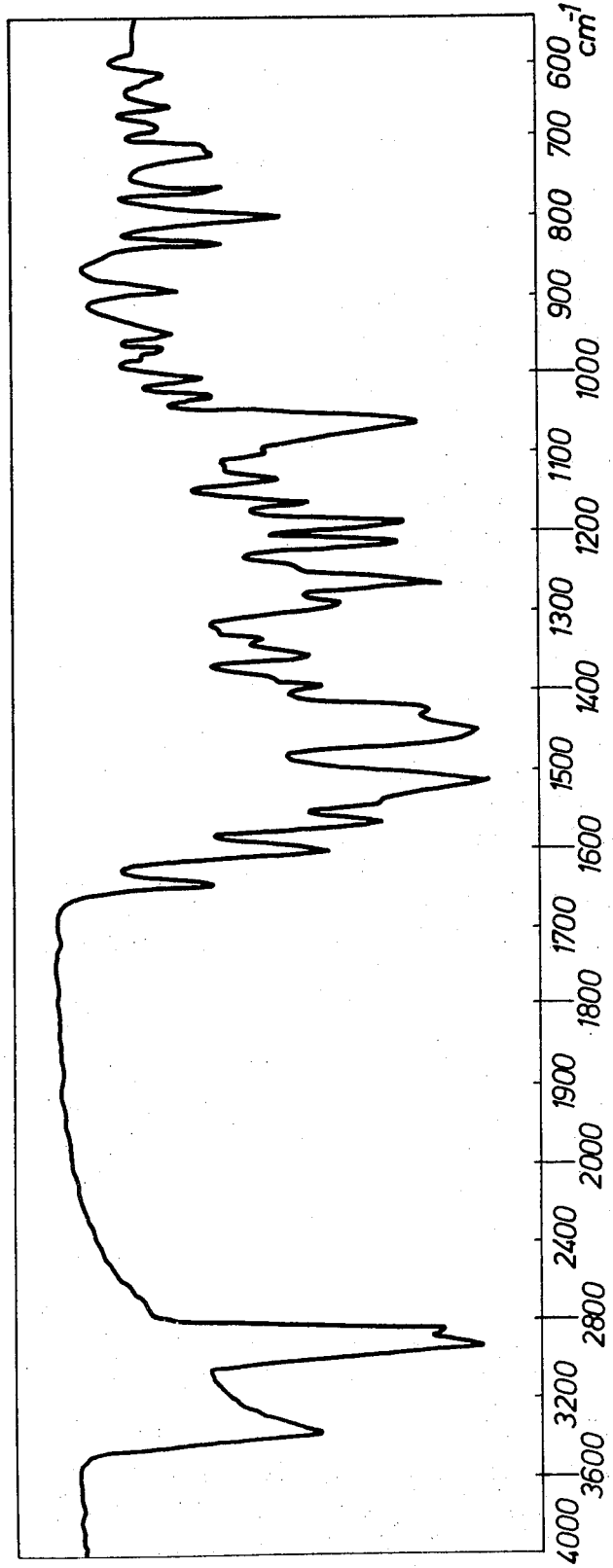

It exhibits infrared absorption bands in Nujol mull at 3,350, 1,640, 1,600, 1,570, 1,425, 1,290, 1,265, 1,210, 1,190, 1,160, 1,130, 1,070, 890, 835, 800, 765, 710 in reciprocal centimeters as shown in FIG. 4.

EXAMPLE 3

A solution of 1 g. of 1,2,3,10,11,11a-hexahydro-7,11-dimethoxy-8-hydroxy-5H-pyrrolo[2,1-c][1,4]benzodiazepin-5-one in excess amount of chloroform or ethyl acetate was concentrated to smaller amount which was treated with n-hexane to form a precipitate. The precipitate was filtered and washed with ether while cooling it to obtain faint yellow powders of about 700 mg. of 1,2,3,11a-tetrahydro-2-ethylidene-7-methoxy-8-hydroxy-5H-pyrrolo[2,1-c][1,4]benzodiazepin-5-one melting at 108°–112° C. (decomposed).

Analysis calculated for $C_{15}H_{16}N_2O_3$:

|  | C | H | O | N |
|---|---|---|---|---|
|  | 66.16 | 5.92 | 17.63 | 10.29 |
| Found: | 66.04 | 6.02 | 17.55 | 10.41 |

EXAMPLE 4

To a solution of 100 mg. of 1,2,3,10,11,11a-hexahydro-2-ethylidene-8-hydroxy-7,11-dimethoxy-5H-pyrrolo[2,1-c][1,4]benzodiazepin-5-one in 5 ml. of pyridine was added dropwise 0.2 ml. of acetic anhydride while cooling the solution. The reaction mixture was allowed to stand overnight at room temperature and poured into an ice-water mixture to form a precipitate which was filtered, washed with water, dissolved in 1 ml. of methanol and kept in a cold place. The resultant precipitate was recrystallized from methanol to obtain faint yellow needle of 1,2,3,10,11,11a-hexahydro-2-ethylidene-7,11-dimethoxy-8-acetyloxy-5H-pyrrolo[2,1-c]-[1,4]benzodiazepin-5-one melting at 132°–133° C.

Analysis calculated for $C_{18}H_{22}N_2O_5$:

|  | C | H | O | N |
|---|---|---|---|---|
|  | 62.41 | 6.40 | 23.10 | 8.09 |
| Found: | 62.30 | 6.53 | 23.24 | 7.95 |

EXAMPLE 5

To a solution of 300 mg. of 1,2,3,10,11,11a-hexahydro-2-ethylidene-7,11 dimethoxy-8-hydroxy-5H-pyrrolo[2,1-c][1,4]benzodiazepin-5-one in 5 ml. of pyridine was added 400 mg. of p-bromobenzoic anhydride. The reaction mixture was allowed to stand overnight to form a precipitate which was filtered, washed with chloroform, washed with 5 percent sodium bicarbonate aqueous solution and 2N hydrochloric acid and concentrated to smaller amount. It was adsorbed on silica gel in a column and eluted with a mixture of chloroform and ethyl acetate (8 : 1). The eluate was concentrated to form crude 1,2,3,10,11,11a-hexahydro-2-ethylidene-7,11-dimethoxy-8-p-bromobenzoyloxy-5H-pyrrolo[2,1-c][1,4]benzodiazepin-5-one which was treated with acetonitrile to obtain a white needle of 1,2,3,11a-tetrahydro-2-ethylidene-7-methoxy-8-p-bromobenzoyloxy-5H-pyrrolo[2,1-c][1,4]benzodiazepin-5-one melting at 204°–205° C.

Analysis calculated for $C_{22}H_{19}N_2O_4Br$:

|  | C | H | O | N | Br |
|---|---|---|---|---|---|
|  | 58.02 | 4.17 | 14.07 | 6.15 | 17.58 |
| Found: | 58.12 | 4.25 | 14.00 | 6.50 | 17.58 |

EXAMPLE 6

To a solution of 100 mg. of 1,2,3,10,11,11a-hexahydro-2-ethylidene-7,11-dimethoxy-8-hydroxy-5H-pyrrolo[2,1-c][1,4]benzodiazepin-5-one was dropwise added an ethereal solution of diazomethane. The reaction mixture was allowed to stand overnight in a cold place and concentrated to dryness which was dissolved in 10 ml. of methanol to be followed by the addition of 10 ml. of ethanol and the maintenance of the solution at 0°C to obtain a faint yellow needle of 1,2,3,10,11,11a-hexahydro-7,8,11-trimethoxy-5H-pyrrolo[2,1-c][1,4]benzodiazepin-5-one melting at 82° C.

Analysis calculated for $C_{17}H_{22}N_2O_4$:

|  | C | H | O | N |
|---|---|---|---|---|
|  | 64.13 | 6.97 | 20.10 | 8.80 |
| Found: | 64.33 | 7.05 | 20.24 | 8.60 |

EXAMPLE 7

The formulation of the injectionable solution in an ampoule possesses the following ingredients:

| | |
|---|---|
| 1,2,3,10,11,11a-Hexahydro-2-ethylidene-7,11-dimethoxy-8-hydroxy-5H-pyrrolo[2,1-c][1,4]-benzodiazepin-5-one | 0.02g |
| Ethanol | 10.00ml. |
| Distilled water | 100.00ml. |
| 1N NaOH | q.s. |
| pH value | 7.5 |

We claim:

1. A compound of formula:

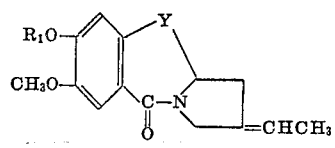

in which $R_1$ is hydrogen, lower alkyl, lower alkyl carbonyl, or halophenyl carboxyl and Y is —N=CH— or —NH—CHR— wherein R is lower alkyl oxy.

2. A compound according to claim 1 in which $R_1$ is hydrogen and Y is —N=CH—.

3. A compound according to claim 1 in which $R_1$ is p-bromobenzoyl oxy and Y is —N=CH—.

4. A compound according to claim 1 in which $R_1$ is hydrogen and Y is —NH—CHR— wherein R is methyl oxy.

5. A compound according to claim 1 in which $R_1$ is hydrogen and Y is —NH—CHR— wherein R is ethyl oxy.

6. A compound according to claim 1 in which $R_1$ is methyl carbonyl and Y is —NH—CHR— wherein R is methyl oxy.

7. A compound according to claim 1 in which $R_1$ is p-bromobenzyl oxy and Y is —NH—CHR— wherein R is methyl oxy.

8. A compound according to claim 1 in which $R_1$ is methyl and Y is —NH—CHR— wherein R is methyl oxy.

9. A compound according to claim 1 wherein $R_1$ is hydrogen, lower alkyl having up to four carbon atoms, lower alkyl carbonyl having up to five carbon atoms or halophenyl carbonyl and Y is —N=CH— or —NH—CHR wherein R is lower alkyl oxy having up to four carbon atoms.

* * * * *